United States Patent [19]

Jean et al.

[11] 3,739,075

[45] June 12, 1973

[54] CABLE STRINGING AND INSULATING APPARATUS AND METHOD

[75] Inventors: Leonard P. Jean, Nashua, William L. Hendrix, Amherst, both of N.H.

[73] Assignee: Hendrix Wire and Cable Corporation, Milford, N.H.

[22] Filed: Apr. 12, 1971

[21] Appl. No.: 132,965

[52] U.S. Cl. ................ 174/40 R, D26/10, 29/241, 174/165, 174/173, 174/175, 174/194, 174/212, 254/134.3 PA
[51] Int. Cl. ................ H02g 1/04, H01b 17/22
[58] Field of Search ............... 174/40 R, 43, 45 R, 174/158 R, 164, 165, 168, 169, 172, 173, 174, 175, 194, 195, 200, 202, 203, 204, 205, 206, 211, 212, 196; 29/241; 254/134.3 R, 134.3 PA; D26/10

[56] References Cited
UNITED STATES PATENTS

| | | | |
|---|---|---|---|
| 876,828 | 1/1908 | McNutt | 174/200 X |
| 450,708 | 4/1891 | Creighton | 174/164 |
| 587,614 | 8/1897 | Stram | 174/174 UX |
| 783,229 | 2/1905 | Steinberger | 174/156 |
| 971,785 | 10/1910 | Pierce | 174/156 |
| 1,061,823 | 5/1913 | Cronin | 174/173 |
| 1,229,272 | 6/1917 | Irwin | 174/174 X |
| 1,768,948 | 7/1930 | Baum | 174/212 X |
| 3,021,381 | 2/1962 | Wengen | 174/173 UX |
| 3,300,576 | 1/1967 | Hendrix et al. | 174/173 X |
| 3,460,787 | 8/1969 | Petze, Jr. | 174/173 X |

FOREIGN PATENTS OR APPLICATIONS

| | | | |
|---|---|---|---|
| 1,465,801 | 9/1969 | Germany | 174/173 |
| 775,408 | 5/1957 | Great Britain | 174/173 |
| 1,215,136 | 11/1959 | France | 174/174 |
| 1,222,403 | 1/1960 | France | 174/194 |
| 978,501 | 12/1964 | Great Britain | 174/211 |
| 528,353 | 6/1955 | Italy | 174/168 |

OTHER PUBLICATIONS

Catalog Entitled "Locke RM Handylog", Third Edition, Published Aug. 1952, pages 36 and 43 relied on.

*Primary Examiner*—Laramie E. Askin
*Attorney*—Chittick, Pfund, Birch, Samuels & Gauthier

[57] ABSTRACT

Synthetic material, conductor enclosing insulator apparatus for aerial electric power distribution and transmission circuits. Eyelet insulator apparatus for initial stringing and permanent supporting of wires or conductors of aerial electric power circuits. Method of installing open cable or bare wire conductors of electric power distribution or transmission circuits by stringing the conductors through and securing them to overhead mounted insulators of such circuits.

5 Claims, 7 Drawing Figures

PATENTED JUN 12 1973

INVENTORS
WILLIAM L. HENDRIX
LEONARD P. JEAN

BY Chittick, Pfund, Birch,
Samuels, & Gauthier
ATTORNEYS

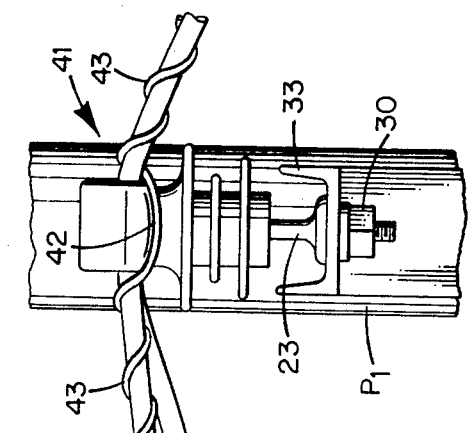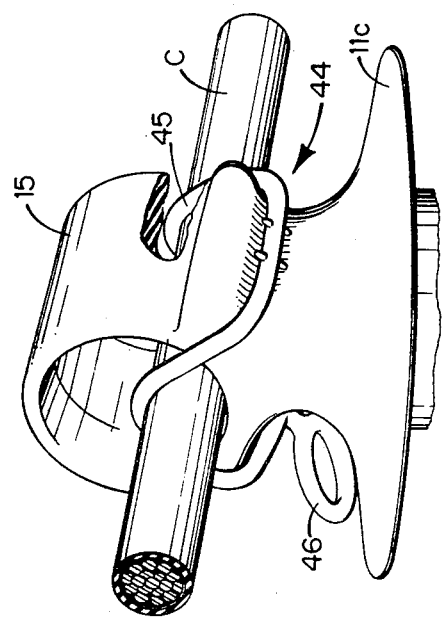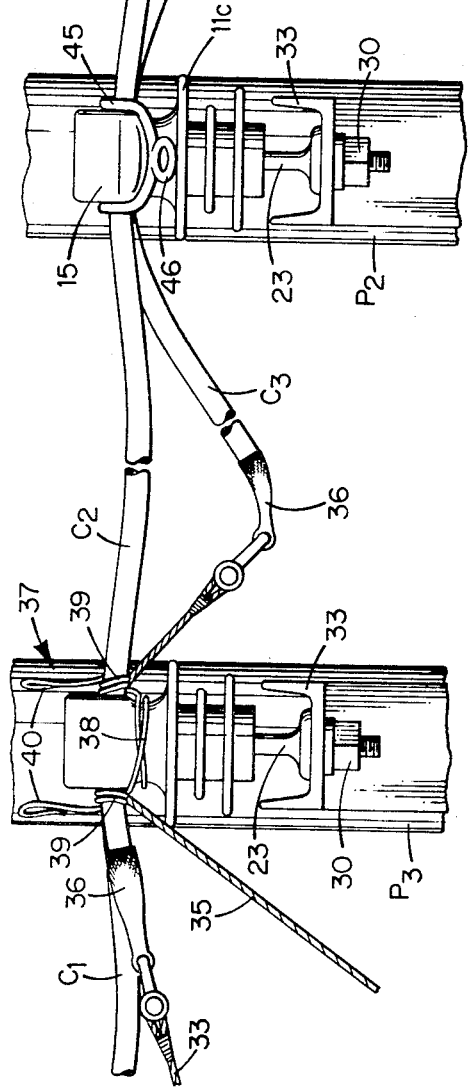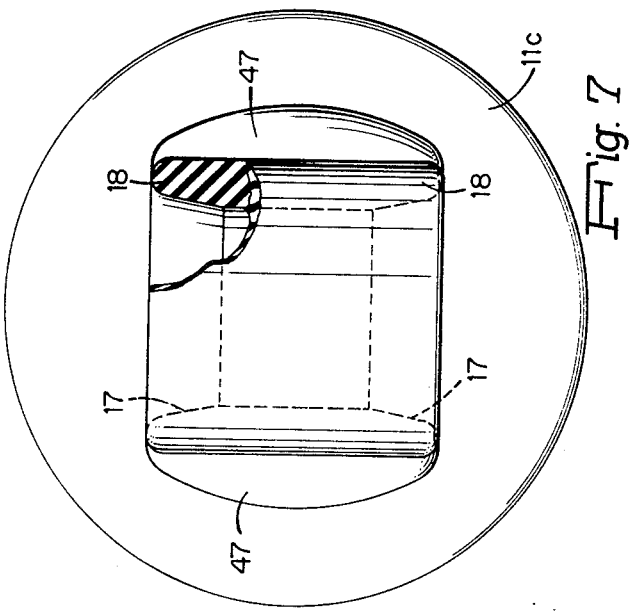

CABLE STRINGING AND INSULATING APPARATUS AND METHOD

BACKGROUND OF THE INVENTION

The field of the invention is apparatus and method for both initial stringing and permanent mounting of the open cable or bare wire conductors of aerial electric power distribution and transmission circuits.

Applicants are aware of no prior art disclosing either the insulator apparatus or the stringing method of the invention.

Among the problems solved by the invention is the inability of the conventional insulator to, and the necessity heretofore of resort to temporary aids to, support the heavy, tensioned conductor while the same is being secured to the pole-mounted insulator.

Another of the problems of the prior art which is solved by the invention concerns the installing and/or reconductoring of the aerial electric power circuits, that requiring heretofore the temporary or permanent installation at each pole or other overhead support of pulley, block and tackle, or the like means, and the hoisting of the conductors to and the running of them through each such auxiliary stringing means, preparatory to engaging the conductors to the pole mounted insulators.

Yet another of the serious difficulties of the prior art which is overcome by the present invention is that, whereas most of the voltage drop between the insulated conductor and the grounded hardware appears across the prior art porcelain insulator when dry, in fog or light rain (for example) the high dielectric constant of the porcelain, combined with its wet surface, tends to throw the voltage distribution towards the circuit conductor, and thereby to hazard the burning of its insulation. This problem is eliminated with the synthetic insulator of the invention, which supplies adequate flashover protection both wet and dry, and whose homogeneous construction has the additional advantage over the prior ceramic insulator of not suffering loss of electrical integrity in the event of surface wear.

BRIEF SUMMARY OF THE INVENTION

The invention provides a permanent insulator constructed of a synthetic plastic and having an eyelet top through and in which electric power distribution or transmission wire or cable is threaded and installed on overhead poles without resort to pulleys or other temporary aids. The invention insulator is further adapted, upon tensioning or sagging of the wire or cable, for that to be secured or tied into the insulator, by any suitable fastening.

The invention insulator comprises also a homogeneous weather washing, leakage-distance-increasing body, and means for removably mounting that on bracket or the like pole-carried support means.

The invention subject matter further comprises eyelet-insulator-incorporating apparatus for outdoor overhead confining, supporting, and securing of open cable and bare wire conductors of electric power distribution and transmission lines.

The invention still further provides a novel method of installing and tieing in and also reconductoring of electric power lines, which eliminates the prior art requirement of resort at each pole to the step of and apparatus for temporarily supporting the conductor independently of, and for securing the conductor to, conventional insulator means.

BRIEF DESCRIPTION OF DRAWINGS

Any person skilled in the art will be enabled to make and use the invention by the following description, taken together with the accompanying drawings, in which:

FIG. 5 is an elevation view of the aerial electric power line apparatus, and illustrating also the conductor stringing and installing method, of the invention;

FIG. 6 shows an embodiment of the insulator adapted to the tieing in of the conductor by the also-illustrated one of the several forms of fastenings alternatively contemplated by the invention; and FIG. 7 is a top plan view of the insulator of FIG. 6.

Figure 1:
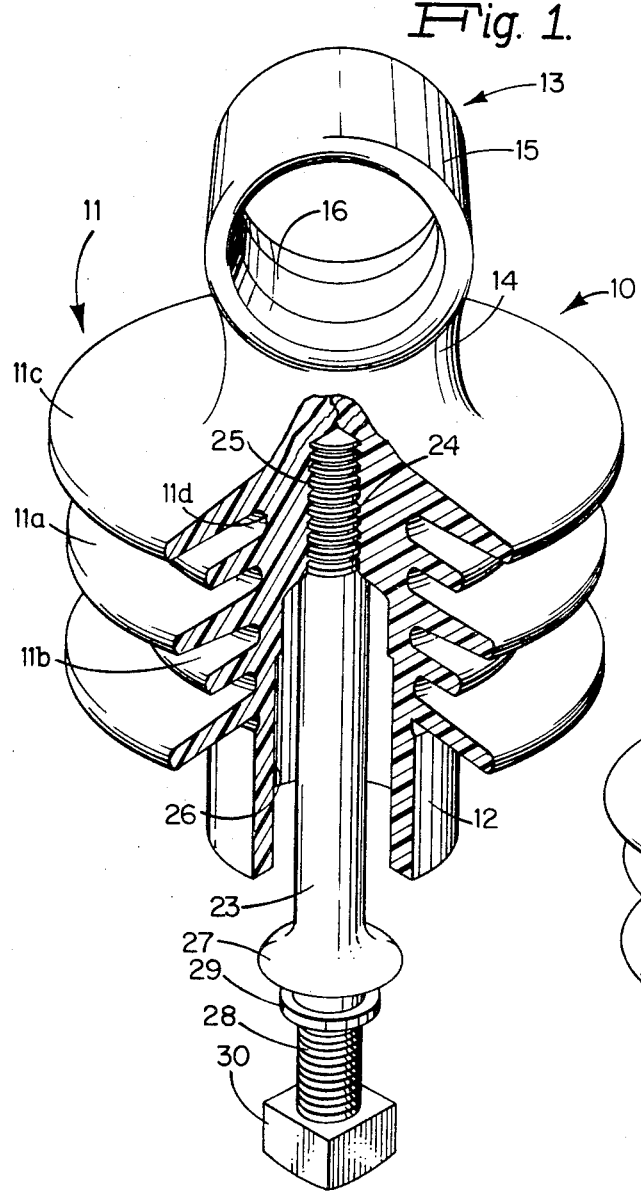
FIG. 1 is a perspective view of one embodiment of the invention insulator, partly broken away to show the interior construction.

The novel insulator hereof comprises a generally annular body 10 generally integrally formed of material and proportion such as to be both shatter proof and crack proof, in withstanding the exigencies of long term outdoor overhead operation under all conditions of weather and atmosphere. The insulator body 10 is further distinguished by the ability to retain its electrical integrity, under all conditions of service wear, atmospheric contamination, and storm hazard.

As well understood in the art, electric power conductors have heretofore been carried on insulators primarily of ceramic construction.

Such prior art ceramic insulators have not been homogeneous, but made up rather of a. a base member of baked ceramic supplying some strength and also a certain amount of electrical value, and b. a glazing or coating having the purpose of (1) sealing out moisture, and (2) thereby augmenting the dielectric property of the ceramic underbody.

As also well known in the art, with such prior art, ceramic insulators, if the glaze is broken, a certain amount of the electrical integrity of the insulator is lost; any fracture of the glaze reduces its electrical or insulating value.

The relative brittleness of the ceramic insulators, and the non-homogeneous character of their insulation-imparting construction, has meant, of course, the expectancy and also common incidence of fracturing and also abrasion or wearing through of the glaze or coating of, and resultant breakdown of the electrical integrity of, such ceramic insulators, all with the consequence that the prior art insulators haVe proven insufficiently reliable in the very long term, outdoor, overhead, all-weather-and-hazard use here concerned, by their indicated vulnerability to unacceptable loss of their electrical integrity, or insulating value.

Under this invention, the problem is solved by the fashioning of the insulator body 10 from a synthetic plastic material which qualifies as a hard synthetic material of some flexibility and toughness, and which is susceptible of being injection molded. The synthetic plastic materials hereof are additionally distinguished by the invention-insulator-qualifying characteristics or properties of: (1) weather resistance; (2) low dielectric constant; (3) low coefficient of friction; (4) good dielectric strength; and (5) freedom from tracking. Synthetic plastic materials enjoying the enumerated properties include such plastics as high density polyethylene, polypropylene, and similar tough electrical grade insulations. A presently preferred material is that referred to in Hendrix U.S. Pat. No. 3,300,576 as, and sold under the designation of, high density polyethylene, electrical grade, and procurable under that designation from any of Union Carbide Corporation, Eastman Chemical Corporation, Celanese Corporation, and Allied Chemical Corporation, all of New York City.

Under the invention, the insulator body 10 is homogeneously formed of a synthetic plastic material, as just described. Preferably, the whole insulator 10 is homogeneous. But, within the invention, that may be homogeneous in at least the surface depth to or through which the particular synthetic plastic material may be worn in use; thereby defining and assuring for the insulator both retention of its electrical value or integrity, and minimized friction or wear on and/or from travelling wire or cable.

As hereinbefore mentioned, when porcelain is dry, most of the voltage drop between insulated conductor and grounded hardware appears across the porcelain. However, with moisture as in fog or light rain, the high dielectric constant of the porcelain combined with its wet surface tends to throw the voltage distribution towards the insulated conductor; and the porcelain insulators of the prior art have given trouble in numerous areas for this additional reason.

This last mentioned problem as well is solved with the invention insulator, through its utilization of a low dielectric constant synthetic plastic material, as well as construction for good electrical and weathering properties.

The insulator body 10 hereof further comprises an odd-numbered plurality of annular ribs or fins 11, herein shown as three or five in number. Under the invention, the fins are alternatively of a greater diameter 11a and lesser diameter 11b, and the top-most fin may be of a third, still larger dimension 11c. The insulator surface corrugating by the fins 11a, 11b, 11c substantially increases the leakage distance thereacross, and the variation in fin size or diameter resists the unwanted accumulation thereon of water or contaminants. The overhang by the larger top fin 11c serves still further to avoid the cascading effect of water droplets, and creates an interruption or discontinuity in the surface water flow, avoiding, in other words, the drop down to the smaller underlying fins.

The insulator body 10 still further comprises an annular skirt 12 which is dependent from the lowermost fin 11, which spaces the fins 11 from and interrupts the leakage path to the insulator support means, and which may be of a similar outside diameter as the recesses 11d defining the roots of lthe insulator fins 11.

The insulator hereof is novelly formed at the top with a central upstanding projection defined as a short, transverse sleeve, ring or eye (or eyelet) 13. The eye 13 surmounts a rounded, concave neck 14, and has a generally cylindrical main body portion 15, which portion is interiorly formed with a cylindrical intermediate wall 16 spacing flarent or tapering outer portions 17, 17 merging with the outside of the body portion 15 at rounded ends 18, 18, FIG. 7.

From the foregoing those skilled in the art will appreciate that the compressive forces normally encounted do not present a fracturing problem with the plastic insulator configuration hereof, and that the neck 14 and eye 13 are designed for a cantilever strength adequate to the angles allowed in use.

Under the invention, the size of the eye opening, as at the cylindrical or smaller intermediate wall portion 16, and which may be, say, two inches in diameter, is large enough to receive the conductors of the circuits on which the insulator is adapted or intended to be used, and also to receive the conductor or cable pulling ropes, and additionally the pulling grips by which said ropes are engaged to the cable, as hereinafter mentioned.

The insulator eye, or integral wire enclosure 13, is interiorly smooth, outwardly tapered, and terminally rounded, as just described, for good sliding therethrough of the circuit cable or conductors in whatever direction they may be inclined, recognizing that said conductors may take a strain and also be subject to some travelling, or movement relative to the eye, while laterally or even upwardly, as well as downwardly, inclined, relative to the insulator.

Generally, as in FIGS. 1, 2 and 5–7, the eye may be complete, or closed. In this configuration, it will be understood, the eye 13 can be cut with a hack saw, or sawed even with a nylon cord, to free the conductor, should it become necessary to replace a particular invention insulator for any reason.

Figure 3:
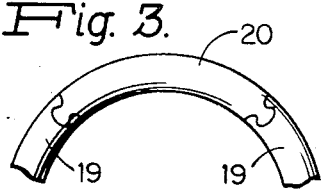
FIGS. 3 and 4 show modified forms of the insulator eye, or conductor confining means.

Alternatively the eye may be formed with integral side portions 19 spanned by a top knock out section 20, FIG. 3, having a tongue and groove or other interfitting with said side portions permitting its lateral removal, as upon impact or blow from a lineman's tool; said knockout portion 20 also being of a length to provide upon its said removal an opening passing or permitting the lifting therethrough of the circuit cable or conductor, as for repair or replacement of the same.

Figure 4:
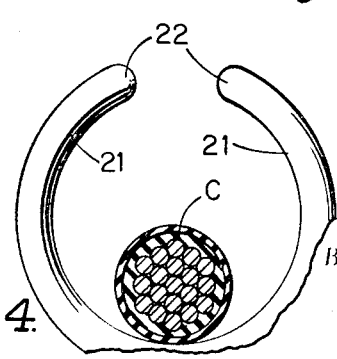

As a further alternative, the eye 13 may be formed with the open configuration shown in FIG. 4 wherein the eye side arms 21, 21 are spaced apart less than, or more particularly terminate upwardly at rounded ends 22, 22 defining an opening smaller than, the cable C. In the FIG. 4 embodiment the eye side arms 21, 21 are also of a wall thickness according thereto to a flexibility sufficient to permit their being spread apart to pass the wire or conductor employed on the circuit and as represented at C. With such open form of the eye, it will be understood, considerable force may be required, in the lifting or pulling of the cable C to effect the sufficient spreading apart of the arms 21, 21 to the diameter of the cable, whereby that may be drawn through the thus enlarged opening 22, 22.

Within the invention, the insulator hereof may be of pin or post-type, and in either form comprises further means for attaching the insulator to an elevated cable and wire supporting structure, and more particularly for attaching it to bracket or the like means for mounting it on poles or other elevated support means such as employed for the aerial electric power distribution and transmission circuits here concerned.

In the pin type of FIG. 1, the insulator attaching means comprises a steel pin 23 of a mechanical strength to withstand the transfer or bending force from side pulls on the insulator, as particularly at corners. Pin 23 is formed at its upper end with threads 24 by which it may be screwed into matingly threaded socket 25 integrally formed in the insulator body. The pin threads 24 may be of soft or lead construction, whereby both they and the insulator threads 25 may be somewhat yielding in, and so as to bindingly engage in, their aforementioned interfitting or screwing together.

Below the pin threads 24 the insulator bottom opening is enlarged at 26 whereby to space the insulator body from, and more particularly the concentric skirt 12 from, the smooth shank of the pin 23.

At a point spaced below the insulator bottom skirt 12, the attaching pin 23 is formed with a base or intermediate flange 27 from which depends a threaded stem or stud 28 receiving a lock washer 29 and clamp nut 30.

Figure 2:
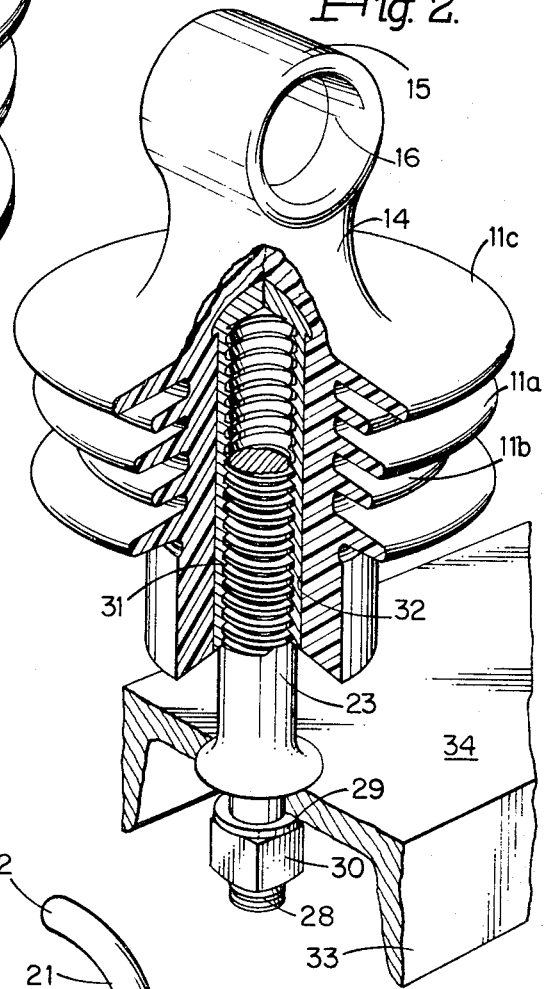
FIG. 2 is a like view of another insulator embodiment, and showing also the attachment to pole-carried insulator mounting means.

In the post form of FIG. 2 the insulator is solid, or solidly engages or receives, in a full length threaded socket recess, the same attaching pin 23. Or, in lieu of the plastic threads of an entirely homogeneous insulator, and as actually shown in FIG. 2, the pin 23 may be threaded into a matingly threaded sleeve 31 which is in turn press fitted into a socket 32 conformantly molded in and centrally vertically of the insulator.

As shown in FIGS. 2 and 5 insulator attaching means or pin 23 adapts the insulator for rigidly affixing to an apertured plane or block portion 34 of a tangent, angle, or top bracket 33, or of any like mounting means, and such as conventionally of channel construction, as shown, and bolted or otherwise fixed in turn to poles P or the like means for the aerial support of the electric power distribution and transmission circuits here concerned. It will be understood that the insulator pin stud 28 may be passed through bracket 33 from either side, and the pin clamped to the bracket, by the locking up of the nut and washer 29, 30, with the base 27 within or without the channel, as with brackets of U-form.

The invention provides, it will be understood, a wire stringing and supporting insulator for electric power distribution and transmission circuits of single or plural phases and comprised of one or more conductors which may be bare wire but which primarily are of open cable construction. With open cable there is employed an insulated wire carried on pole mounted insulators, whereby is avoided casual grounding to prevent outages such as would result from a tree branch touching bare wire. With open cable also, the one or more wires making the one or more phase circuits comprise conductors which are insulated but not also shielded, and so requiring also the insulators, and additionally the strength for long spans and in the absence of the protection afforded by aerial cable. As well understood in the art, it has heretobefore been necessary, in the installation of such open cable, to string the cable with the use of stringing blocks such as may be mounted on the cross arms before or after the poles are erected. Further, in connection with the sagging of the conductors, and the installing of them on the side of and preparatory to their tying to conventional insulators, it has been necessary to resort to the awkward use of temporary aids of one sort or another such as a block and tackle, or hand winch of some kind, with a ratchet handle, for suspending above the insulator and drawing up to, and supporting at, the desired point of insulator engagement, the very considerable weight of the conductor span involved.

It will be apparent herefrom that both the installing and the supporting of the conductors are together served by, and further that they are jointly also vastly simplified by, the insulator of the present invention.

FIG. 5 illustrates the installing and supporting of conductors C–1, C–2, and C–3 of an open cable or bare wire circuit of electric power distribution or transmission voltages, of any length, and as aerially supported on at least three poles P–1, P–2, and P–3.

In the installing of the overhead electric power circuits according to the invention, upon the erection of the poles P with the insulators mounted thereon by the brackets 33, light lines 35 are passed through the insulator eyes 13 and left with their ends hanging free to or within reach of the ground. The leading conductor end is then brought to the first such light line 35, then engaged as with a conventional seizing or pulling sleeve, grip or the like 36, and then simply pulled by said seizing means 36 through the first insulator and forwardly of that to within reach of the next light line 35. The conductor is then disengaged from the first and engaged to the second light line 35 for pulling through the insulator on the next pole P; and so on, with the process being repeated to the end of the circuit, as herein at the poles $P_1$, $P_2$, and $P_3$. Thereafter the conductor will be anchored or dead ended at one end, and tensioned at the other for proper sag. In FIG. 5, illustrating the method, the conductor C–1 is shown as fully installed, the conductor C–2 as being tensioned, and the conductor C–3 as being pulled through the insulator at pole P–3.

Under the invention, means are provided for tying in the circuit wire or cable, by engaging or fastening both to the insulator and to the cable as received through the insulator eye. Such tying in means, or cable fastenings, may suitably be of wire, elastic tie, preformed tie, or other types or forms, of which three are illustrated in FIGS. 5 and 6.

In the form illustrated at pole P–3, the fastening comprises a soft metal element 37 having an intermediate portion 38 passed outside and more particularly around the neck 14 of the insulator, and outer portions 39 wrapped around the conductor C at both sides of the insulator 10.

This soft metal element form may further comprise end or terminal portions 40 extending away from the conductor at either other side of the insulator and presenting loops or other formations that are hand-or tool-manipulable to disengage the wound portions 39 from the conductor.

The conductor fastening means may alternatively comprise a preformed element 41 as shown at pole P–1, of spring metal or plastic construction, and having an untwisted intermediate portion 42 passed outside the insulator and terminating in twisted end portions 43 wrapped about the conductor at both sides of the insulator. Such alternative form of fastening 41 is of spring metal or plastic material and construction having a stiffness to retain its indicated preformed configuration, but also a resiliency to permit its being manually unwrapped from the conductor.

In the form shown at pole P–2 and in FIG. 6 the fastening means comprises a rubber or other elastic tie 44 having a closed loop portion 45 and integrally projecting therefrom a ring or other tool-engagable manipulating portion 46.

For cooperation with the elastic tie 44 the insulator eye is provided with a pair of longitudinally disposed, laterally projecting flanges or ears 47 on the opposite faces of the eye 13 above the neck 14.

In the installing of the tie 44, the loop 45 is passed under one of the ears 47 and over the conductor C, and then stretched or drawn down over the opposite ear 47 so as to contractively engage thereunder when released, as shown in FIGS. 5 and 6. For disengaging the ring or loop tie 44, the manipulating ring 46 need merely be engaged by hand, or from the ground or truck by suitable lineman's tool, to again stretch the loop 45 whereby that may be passed upwardly over the ear 47, relieving the tension on the loop 45 and disengaging that from the conductor C.

We claim:

1. The method of initially stringing and permanently installing open cable or bare wire conductors of electric power distribution or transmission circuits on a series of outdoor overhead supports which comprises the steps of
   1. mounting eyelet insulators on the supports;
   2. passing light lines through the insulators and allowing the line ends to hang free to within reach of the ground;
   3. engaging the leading end of a conductor to the light line passed through the insulator of the support at one end of said series;
   4. pulling the conductor through the insulator of that support;
   5. successively disengaging the conductor from one and engaging it to the next of said lines, and successively pulling said lines to draw the conductor through all the eyelet insulators of said support series; and
   6. securing the conductor against lengthwise sliding in each of said eyelet insulators.

2. The method of initially stringing and permanently installing open cable or bare wire conductors of electrical power distribution or transmission circuits on a series of outdoor overhead supports which comprise the steps
   1. mounting eyelet insulators on the supports;
   2. passing light lines through the insulators and allowing the line ends to hang free to within reach of the ground;
   3. engaging the leading end of a conductor to the light line passed through the insulator of the support at one end of said series;
   4. pulling the conductor through the insulator of that support; and
   5. successively disengaging the conductor from one and engaging it to the next of said lines, successively pulling said lines to draw the conductor through all the conductor confining insulators of said support series.

3. Apparatus for both initial stringing of and permanent outdoor overhead mounting of single and plural electric power distribution and transmission circuits comprising
   A. conductor means making up said circuits;
   B. means elevatedly supporting said conductor means;
   C. mounting brackets carried by each said elevatedly supporting means for each said conductor means;
   D. eyelet insulators mounted on said brackets and receiving said conductor means; and
   E. conductor stringing means slidably supported through said eyelet insulators, said conductor stringing means manipulable to draw said conductor means successively through the insulators of said elevatedly supporting means.

4. The apparatus of claim 2, and
   F. means at each said eyelet insulator for securing said conductor means against lengthwise sliding movement therewithin following upon the initial stringing of said circuits by said drawing of said conductor means through said insulators.

5. The apparatus of claim 3, wherein said conductor stringing means comprise
   $E_1$. light lines passed through said eyelet insulators and left with their ends hanging free to within reach of the ground.

* * * * *